United States Patent
Provino

(10) Patent No.: US 6,557,037 B1
(45) Date of Patent: *Apr. 29, 2003

(54) SYSTEM AND METHOD FOR EASING COMMUNICATIONS BETWEEN DEVICES CONNECTED RESPECTIVELY TO PUBLIC NETWORKS SUCH AS THE INTERNET AND TO PRIVATE NETWORKS BY FACILITATING RESOLUTION OF HUMAN-READABLE ADDRESSES

(75) Inventor: Joseph E. Provino, Cambridge, MA (US)

(73) Assignee: Sun Microsystems, Palo Alto, CA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/087,823

(22) Filed: May 29, 1998

(51) Int. Cl.⁷ .................................................. G06F 15/16
(52) U.S. Cl. ........................ 709/227; 709/225; 709/228; 709/245; 713/201
(58) Field of Search .............................. 709/227, 228, 709/250, 245, 225; 713/201

(56) References Cited

U.S. PATENT DOCUMENTS

| | | | | |
|---|---|---|---|---|
| 5,805,803 A | * | 9/1998 | Birrell et al. | 395/187.01 |
| 5,826,029 A | * | 10/1998 | Gore, Jr. et al. | 395/200.57 |
| 5,898,830 A | * | 4/1999 | Wesinger, Jr. et al. | 395/187.01 |
| 5,983,270 A | * | 11/1999 | Abraham et al. | 709/224 |
| 6,003,084 A | * | 12/1999 | Green et al. | 709/227 |
| 6,006,268 A | * | 12/1999 | Colie et al. | 709/227 |
| 6,119,234 A | * | 9/2000 | Aziz et al. | 713/201 |

FOREIGN PATENT DOCUMENTS

| | | |
|---|---|---|
| EP | 0 825 784 A2 | 7/1997 |
| EP | 0 887 979 A2 | 6/1998 |

* cited by examiner

Primary Examiner—Dung C. Dinh
Assistant Examiner—Abdullahi E. Salad
(74) Attorney, Agent, or Firm—McCormick, Paulding & Huber LLP

(57) ABSTRACT

"A system [comprises] includes a virtual private network and an external device interconnected by a digital network. The virtual private network has a firewall, at least one internal device and a nameserver each having a network address. The internal device also has a secondary address, and the nameserver is configured to provide an association between the secondary address and the network address. The firewall, in response to a request from the external device to establish a connection therebetween, provides the external device with the network address of the nameserver. The external device, in response to a request from an operator or the like, including the internal device's secondary address, requesting access to the internal device, generates a network address request message for transmission over the connection to the firewall requesting resolution of the network address associated with the secondary address. The firewall provides the address resolution request to the nameserver, and the nameserver provides the network address associated with the secondary address to the firewall. The firewall, in turn, provides the network address in a network address response message for transmission over the connection to the external device. The external device can thereafter use the network address so provided in subsequent communications with the firewall intended for the internal device."

18 Claims, 1 Drawing Sheet

SYSTEM AND METHOD FOR EASING COMMUNICATIONS BETWEEN DEVICES CONNECTED RESPECTIVELY TO PUBLIC NETWORKS SUCH AS THE INTERNET AND TO PRIVATE NETWORKS BY FACILITATING RESOLUTION OF HUMAN-READABLE ADDRESSES

FIELD OF THE INVENTION

The invention relates generally to the field of digital communications systems and methods, and more particularly to systems and methods for easing communications between devices connected to public networks such as the Internet and devices connected to private networks.

BACKGROUND OF THE INVENTION

Digital networks have been developed to facilitate the transfer of information, including data and programs, among digital computer systems and other digital devices. A variety of types of networks have been developed and implemented, including so-called "wide-area networks" (WAN's) and "local area networks" (LAN's), which transfer information using diverse information transfer methodologies. Generally, LAN's are implemented over relatively small geographical areas, such as within an individual office facility or the like, for transferring information within a particular office, company or similar type of organization. On the other hand, WAN's are generally implemented over relatively large geographical areas, and may be used to transfer information between LAN's as well as between devices that are not connected to LAN's. WAN's also include public networks, such as the Internet, which can carry information for a number of companies.

Several problems have arisen in connection with communication over a network, particularly a large public WAN such as the Internet. Generally, information is transferred over a network in message packets, which are transferred from one device, as a source device, to another device as a destination device, through one or more routers or switching nodes (generally, switching nodes) in the network. Each message packet includes a destination address which the switching nodes use to route the respective message packet to the appropriate destination device. Addresses over the Internet are in the form of an "n"-bit integer (where "n" may be thirty two or 128), which are difficult for a person to remember and enter when he or she wishes to enable a message packet to be transmitted. To relieve a user of the necessity of remembering and entering specific integer Internet addresses, the Internet provides second addressing mechanism which is more easily utilized by human operators of the respective devices. In that addressing mechanism, Internet domains, such as LAN's, Internet service providers ("ISP's") and the like which are connected in the Internet, are identified by relatively human-readable names. To accommodate the use of human-readable names, nameservers, also referred to as DNS servers, are provided to resolve the human-readable names to the appropriate Internet addresses. When an operator at one device, wishing to transmit a message packet to another device, enters the other device's human-readable name, the device will initially contact a nameserver. Generally, the nameserver may be part of the ISP itself or it may be a particular device which is accessible through the ISP over the Internet; in any case, the ISP will identify the nameserver to be used to the device when the device logs in to the ISP. If, after being contacted by the device, the nameserver has or can obtain an integer Internet address for the human-readable domain name, it (that is, the nameserver) will provide the integer Internet address corresponding to the human-readable domain name to the operator's device. The device, in turn, can thereafter include the integer Internet address returned by the nameserver in the message packet and provide the message packet to the ISP for transmission over the Internet in a conventional manner. The Internet switching nodes use the integer Internet address to route the message packet to the intended destination device.

Other problems arise, in particular, in connection with the transfer of information over a public WAN such as the Internet. One problem is to ensure that information transferred over the WAN that the source device and the destination device wish to maintain confidential, in fact, remains confidential as against possible eavesdroppers which may intercept the information. To maintain confidentiality, various forms of encryption have been developed and are used to encrypt the information prior to transfer by the source device, and to decrypt the information after it has been received by the destination device. If it is desired that, for example, all information transferred between a particular source device and a particular destination device is maintained confidential, the devices can establish a "secure tunnel" therebetween, which essentially ensures that all information to be transferred by the source device to the destination device is encrypted (except for certain protocol information, such as address information, which controls the flow of network packets through the network between the source and destination devices) prior to transfer, and that the encrypted information will be decrypted prior to utilization by the destination device. The source and destination devices may themselves perform the encryption and decryption, respectively, or the encryption and decryption may be performed by other devices prior to the message packets being transferred over the Internet.

A further problem that arises in particular in connection with companies, government agencies, and private organizations whose private networks, which may be LAN's, WAN's or any combination thereof, are connected to public WAN's such as the Internet, is to ensure that their private networks are secure against others whom the companies do not wish to have access thereto, or to regulate and control access by others whom the respective organizations may wish to have limited access. To accommodate that, the organizations typically connect their private networks to the public WAN's through a limited number of gateways sometimes referred to as "firewalls," through which all network traffic between the internal and public networks pass. Typically, network addresses of domains and devices in the private network "behind" the firewall are known to nameservers which are provided in the private network, but are not available to nameservers or other devices outside of the private network, making communication between a device outside of the private network and a device inside of the private network difficult.

SUMMARY OF THE INVENTION

The invention provides a new and improved system and method for easing communications between devices connected to public networks such as the Internet and devices connected to private networks by facilitating resolution of secondary addresses, such as the Internet's human-readable addresses, to network addresses by nameservers or the like connected to the private networks.

In brief summary, the invention provides a system comprising a virtual private network and an external device interconnected by a digital network. The virtual private network has a firewall, at least one internal device and a nameserver each having a network address. The internal device also has a secondary address, and the nameserver is configured to provide an association between the secondary address and the network address. The firewall, in response to a request from the external device to establish a connection therebetween, provides the external device with the network address of the nameserver. The external device, in response to a request from an operator or the like, including the internal device's secondary address, requesting access to the internal device, generates a network address request message for transmission over the connection to the firewall requesting resolution of the network address associated with the secondary address. The firewall provides the address resolution request to the nameserver, and the nameserver provides the network address associated with the secondary address to the firewall. The firewall, in turn, provides the network address in a network address response message for transmission over the connection to the external device. The external device can thereafter use the network address so provided in subsequent communications with the firewall intended for the internal device.

BRIEF DESCRIPTION OF THE DRAWINGS

This invention is pointed out with particularity in the appended claims. The above and further advantages of this invention may be better understood by referring to the following description taken in conjunction with the accompanying drawing, in which:

DETAILED DESCRIPTION OF AN ILLUSTRATIVE EMBODIMENT

Figure 1:
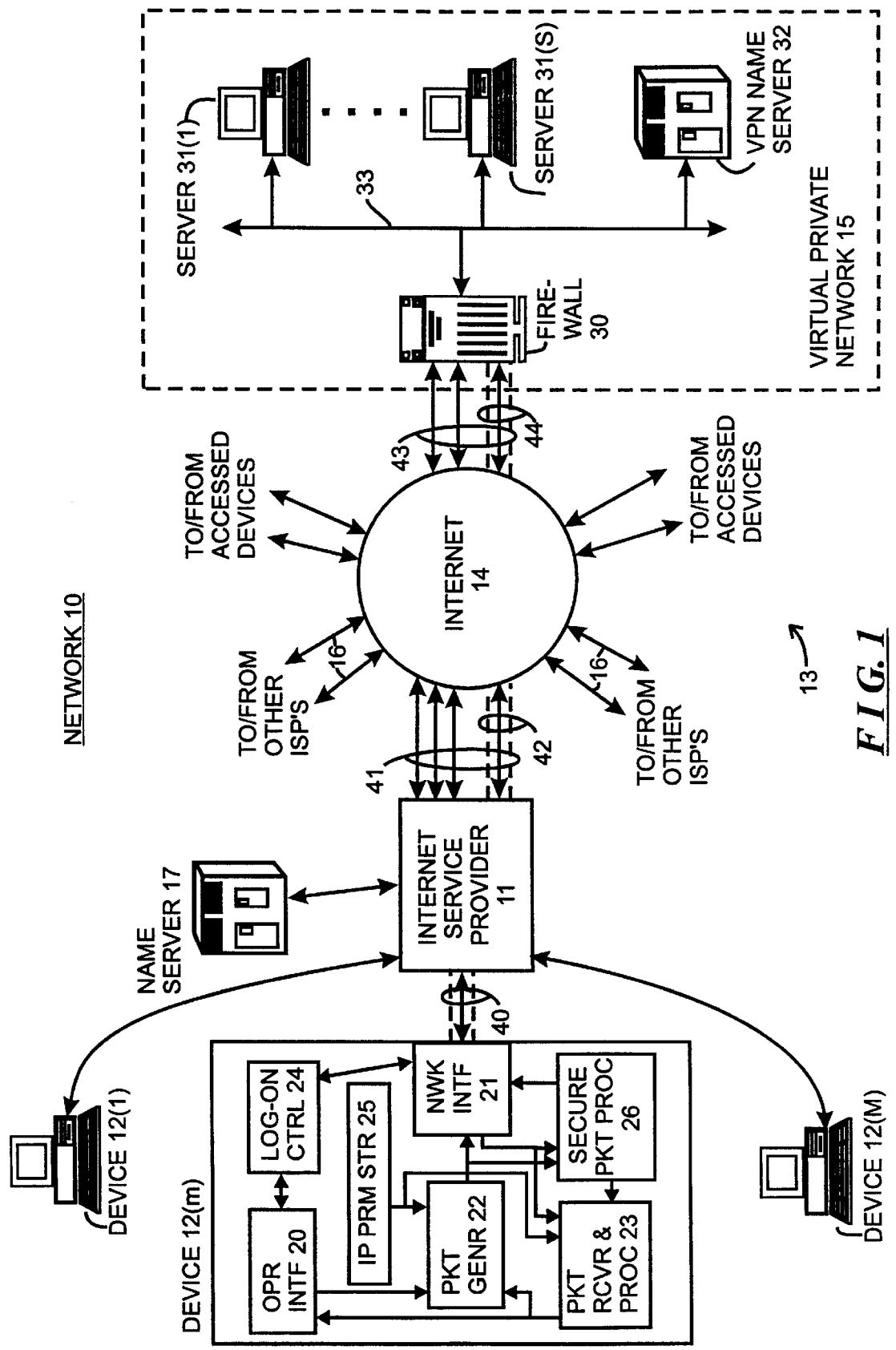
FIG. 1 is a functional block diagram of a network constructed in accordance with the invention.

FIG. 1 is a functional block diagram of a network 10 constructed in accordance with the invention. The network 10 as depicted in FIG. 1 includes an Internet service provider ("ISP") 11 which facilitates the transfer of message packets among one or more devices 12(1) through 12(M) (generally identified by reference numeral 12(m)) connected to ISP 11, and other devices, generally identified by reference numeral 13, over the Internet 14, thereby to facilitate the transfer of information in message packets among the devices 12(m) and 13. The ISP 11 connects to the Internet 14 over one or more logical connections or gateways or the like (generally referred to herein as "connections") generally identified by reference numeral 41. The ISP 11 may be a public ISP, in which case it connects to devices 12(m) which may be controlled by operators who are members of the general public to provide access by those operators to the Internet. Alternatively, ISP 11 may be a private ISP, in which case the devices 12(m) connected thereto are generally operated by, for example, employees of a particular company or governmental agency, members of a private organization or the like, to provide access by those employees or members to the Internet.

As is conventional, the Internet comprises a mesh of switching nodes (not separately shown) which interconnect ISP's 11 and devices 13 to facilitate the transfer of message packets thereamong. The message packets transferred over the Internet 14 conform to that defined by the so-called Internet protocol "IP" and include a header portion, a data portion, and may include a error detection and/or correction portion. The header portion includes information used to transfer the message packet through the Internet 14, including, for example, a destination address that identifies the device that is to receive the message packet as the destination device and a source address that identifies the device which generated the message packet. For each message packet, the destination and source addresses are each in the form of an integer that uniquely identifies the respective destination and source devices. The switching nodes comprising the Internet 14 use at least the destination address of each respective message packet to route it (that is, the respective message packet) to the destination device, if the destination device is connected to the Internet, or to an ISP 11 or other device connected to the Internet 14, which, in turn, will forward the message packet to the appropriate destination. The data portion of each message packet includes the data to be transferred in the message packet, and the error detection and/or correction portion contains error detection and/or correction information which may be used to verify that the message packet was correctly transferred from the source to the destination device (in the case of error detection information), and correct selected types of errors if the message packet was not correctly transferred (in the case of error correction information).

The devices 12(m) connected to ISP 11 may comprise any of a number of types of devices which communicate over the Internet 14, including, for example, personal computers, computer workstations, and the like, with other devices 13. Each device 12(m) communicates with the ISP 11 to transfer message packets thereto for transfer over the Internet 14, or to receive message packets therefrom received by the ISP 11 over the Internet 14, using any convenient protocol such as the well-known point-to-point protocol ("PPP") if the device 12(m) is connected to the ISP 11 using a point-to-point link, any conventional multi-drop network protocol if the device 12(m) is connected to the ISP 11 over a multi-drop network such as the Ethernet, or the like. The devices 12(m) are generally constructed according to the conventional stored-program computer architecture, including, for example, a system unit, a video display unit and operator input devices such as a keyboard and mouse. A system unit generally includes processing, memory, mass storage devices such as disk and/or tape storage elements and other elements (not separately shown), including network and/or telephony interface devices for interfacing the respective device to the ISP 11. The processing devices process programs, including application programs, under control of an operating system, to generate processed data. The video display unit permits the device to display processed data and processing status to the user, and the operator input device enables the user to input data and control processing.

These elements of device 12(m), along with suitable programming, cooperate to provide device 12(m) with a number of functional elements including, for example, an operator interface 20, a network interface 21, a message packet generator 22, a message packet receiver and processor 23, an ISP log-on control 24, an Internet parameter store 25 and, in connection with the invention, a secure message packet processor 26. The operator interface 20 facilitates reception by the device 12(m) of input information from the operator input device(s) of device 12(m) and the display of output information to the operator on the video display device(s) of the device 12(m). The network interface 21 facilitates connection of the device 12(m) to the ISP 11 using the appropriate PPP or network protocol, to transmit message packets to the ISP 11 and receive message packets therefrom. The network interface 21 may facilitate connection to the ISP 11 over the public telephone network to allow for dial-up networking of the device 12(m) over the public telephone system. Alternatively or in addition, the network interface 21 may facilitate connection through the ISP 11 over, for example, a conventional LAN such as the Ethernet. The ISP log on control 24, in response to input provided by the operator interface 20 and/or in response to requests from programs (not shown) being processed by the device 12(m), communicates through the network interface 21 to facilitate the initialization ("log-on") of a communications session between the device 12(m) and the ISP 11, during which communications session the device 12(m) will be able to transfer information, in the form of, message packets with other devices over the Internet 14, as well as other devices 12(m') (m'≈m) connected to the ISP 11 or to other ISP's. During a log-on operation, the ISP log-on control 24 receives the Internet protocol ("IP") parameters which will be used in connection with message packet generation during the communications session.

During a communications session, the message packet generator 22, in response to input provided by the operator through the operator interface 20, and/or in response to requests from programs (not separately shown) being processed by the device 12(m), generates message packets for transmission through the network interface 21. The network interface 21 also receives message packets from the ISP 11 and provides them to message packet receiver and processor 23 for processing and provision to the operator interface 20 and/or other programs (not shown) being processed by the device 12(m). If the received message packets contain information, such as Web pages or the like, which is to be displayed to the operator, the information can be provided to the operator interface 20 to enable the information to be displayed on the device's video display unit. In addition or alternatively, the information may be provided to other programs (not shown) being processed by the device 12(m) for processing.

Generally, elements such as the operator interface 20, message packet generator 22, message packet receiver and processor 23, ISP log-on control 24 and Internet parameter store 25 may comprise elements of a conventional Internet browser, such as Mosaic, Netscape Navigator and Microsoft Internet Explorer.

In connection with the invention, as noted above the device 12(m) also includes a secure message packet processor 26. The secure message packet processor 26 facilitates the establishment and use of a "secure tunnel," which will be described below, between the device 12(m) and another device 12 (m') (m'≈m) or 13. Generally, in a secure tunnel, information in at least the data portion of message packets transferred between device 12(m) and a specific other device 12(m') (m'≈m) or 13 is maintained in secret by, for example, encrypting the data portion prior to transmission by the source device. Information in other portions of such message packets may also be maintained in secret, except for the information that is required to facilitate the transfer of the respective message packet between the devices, including, for example, at least the destination information, so as to allow the Internet's switching nodes and ISP's to identify the device that is to receive the message packet.

In addition to ISP 11, a number of other ISP's may connect to the Internet, as represented by arrows 16, facilitating communications between devices which are connected to those other ISP's with other devices over the Internet, which may include the devices 12(n) connected to ISP 11.

The devices 13 which devices 12(m) access and communicate with may also be any of a number of types of devices, including personal computers, computer workstations, and the like, and also including mini-and mainframe computers, mass storage systems, compute servers, local area networks ("LAN's") and wide area networks ("WAN's") including such devices and numerous other types of devices which may be connected directly or indirectly to the networks. In connection with the invention, at least one of the devices will include at least one private network, identified as virtual private network 15, which may be in the form of a LAN or WAN. The virtual private network 15 may comprise any of the devices 12(m') (m'≈m) (thereby connecting to the Internet 14 through an ISP) or 13 (thereby connecting directly to the Internet 14); in the illustrative embodiment described herein, the virtual private network 15 will be assumed to comprise a device 13. The virtual private network 15 itself includes a plurality of devices, identified herein as a firewall 30, a plurality of servers 31(1) through 31(S) (generally identified by reference numeral 31(s)) and a nameserver 32, all interconnected by a communication link 33. The firewall 30 and servers 31(s) maybe similar to any of the various types of devices 12(m) and 13 described herein, and thus may include, for example, personal computers, computer workstations, and the like, and also including mini-and mainframe computers, mass storage systems, compute servers, local area networks ("LAN's") and wide area networks ("WAN's") including such devices and numerous other types of devices which may be connected directly or indirectly to the networks.

As noted above, the devices, including devices 12(m) and devices 13, communicate by transferring message packets over the Internet. The devices 12(m) and 13 can transfer information in a "peer-to-peer" manner, in a "client-server" manner, or both. Generally, in a "peer-to-peer" message packet transfer, a device merely transfers information in one or more message packets to another device. On the other hand, in a "client-server" manner, a device, operating as a client, can transfer a message packet to another device, operating as a server to for example, initiate service by the other device. A number of types of such services will be appreciated by those skilled in the art, including, for example, the retrieval of information from the other device, to enable the other device to perform processing operations, and the like. If the server is to provide information to the client, it (that is, the server) may generally be referred to as a storage server. On the other hand, if the server is to perform processing operations at the request of the client, it (that is, the server) may generally be referred to as a compute server. Other types of servers, for performing other types of services and operations at the request of clients, will be appreciated by those skilled in the art.

In a client/server arrangement, device 12(m) requiring service by, for example, a device 13, generates one or more request message packets requesting the required service, for transfer to the device 13. The request message packet includes the Internet address of the device 13 that is, as the destination device, to receive the message packet and perform the service. The device 12(m) transfers the request message packet(s) to the ISP 11. The ISP 11, in turn, will transfer the message packet over the Internet to the device 13. If the device 13 is in the form of a WAN or LAN, the WAN or LAN will receive the message packet(s) and direct it (them) to a specific device connected therein which is to provide the requested service.

In any case, after the device 13 which is to provide the requested service receives the request message packet(s), it will process the request. If the device 12(m) which generated the request message packet(s), or its operator, has the required permissions to request the service from the device 13 which generated the request message packet, if the requested service is to initiate the transfer of information from the device 13 as a storage server to the device 12(*m*) as client, the device 13 will generate one or more response message packets including the requested information, and transmit the packet(s) over the Internet 14 to the ISP 11. The ISP, 11, in turn, will transfer the message packet(s) to the device 12(*m*). On the other hand, if the requested service is to initiate processing by the device 13 as a compute server, the device 13 will perform the requested computation service(s). In addition, if the device 13 is to return processed data generated during the computations to the device 12(*m*) as client, the device 13 will generate one or more response message packet(s) including the processed data and transmit the packet(s) over the Internet 14 to the ISP 11. The ISP 11, in turn, will transfer the message packet(s) to the device 12(*m*). Corresponding operations may be performed by the devices 12(*m*) and 13, ISP 11 and Internet 14 in connection with other types of services which may be provided by the server devices 13.

As noted above, each message packet that is generated by devices 12(*m*) and 13 for transmission over the Internet 14 includes a destination address, which the switching nodes use to route the respective message packet to the appropriate destination device. Addresses over the Internet are in the form of an "n"-bit integer (where "n" currently may be thirty two or 128). To relieve, in particular, an operator of a device 12(*m*) of the necessity of remembering specific integer Internet addresses and providing them to the device 12(*m*) to initiate generation of a message packet for transmission over the Internet, the Internet provides a second addressing mechanism which is more easily utilized by human operators of the respective devices. In that addressing mechanism, Internet domains, such as LAN's, Internet service providers ("ISP's") and the like which are connected in the Internet, are identified by relatively human-readable names. To accommodate human-readable domain names, ISP 11 is associated with a nameserver 17 (which may also be referred to as a DNS servers), which can resolve the human-readable domain names to provide the appropriate Internet address for the destination referred to in the respective human-readable name. Generally, the nameserver may be part of or connected directly to the ISP 11, as shown in FIG. 1, or it may be a particular device which is accessible through the ISP over the Internet. In any case, as noted above, when the device 12(*m*) logs on to the ISP 11 during a communications session, the ISP 11 will assign various Internet protocol ("IP") parameters which the device 12(*m*) is to use during the communications session, which will be stored in the Internet parameter store 25. These IP parameters include such information as (a) an Internet address for the device 12(*m*) which will identify the device 12(*m*) during the communications session, and (b) the identification of a nameserver 17 that the device 12(*m*) is to use during the communications session.

The device 12(*m*), when it generates message packets for transfer, will include its Internet address (item (a) above) as the source address. The device(s) 13 which receives the respective message packets can use the source address from message packets received from the device 12(*m*) in message packets which they (that is, device(s) 13) generate for transmission to the device 12(*m*), thereby to enable the Internet to route the message packets generated by the respective device 13 to the device 12(*m*). If the device 12(*m*) is to access the nameserver 17 over the Internet 14, the nameserver identification provided by the ISP 11 (item (b) above) will be in the form of an integer Internet address which will allow the device 12(*m*) to generate messages to the nameserver 17 requesting resolution of human-readable Internet addresses into integer Internet addresses. The ISP 11 may also assign other IP parameters to the device 12(*m*) when it logs on to the ISP 11, including, for example, the identification of a connection to the Internet 14 that is to be used for messages transmitted by the device 12(*m*), particularly if the ISP 11 has multiple gateways. Generally, the device 12(*m*) will store the Internet parameters in the Internet parameter store 25 for use during the communications session.

When an operator operating device 12(*m*) wishes to enable the device 12(*m*) to transmit a message packet to a device 13, he or she provides the Internet address for the device 13 to the device 12(*m*), through the operator interface 20, and information, or the identification of information maintained by the device 12(*m*) that is to be transmitted in the message. The operator interface 20, in turn, will enable the packet generator 22 to the required packets for transmission through the ISP 11 over the Internet 11. If (i) the operator has provided the integer Internet address, or (ii) the operator has provided the human-readable Internet address, but the packet generator 22 already has the integer Internet address which corresponds to the human-readable Internet address provided by the operator, the packet generator 22 may generate the packets directly upon being enabled by the operator interface 20, and provide them to the network interface 21 for transmission to the ISP 11.

However, if the operator has provided the human-readable Internet address for the device 13 to which the packets are to be transferred, and if the packet generator 22 does not already have the corresponding integer Internet address therefor, the packet generator 22 will enable the network address to be obtained from the nameserver 17 identified in the IP parameter store 25. In that operation, the packet generator 22 will initially contact nameserver 17 to attempt to obtain the appropriate integer Internet address from the nameserver 17. In these operations, the device 12(*m*) will generate appropriate message packets for transmission to the nameserver 17, using the nameserver's integer Internet address as provided by the ISP 11 when it (that is, the device 12(*m*)) logs on at the beginning of the communications session. In any case, if the nameserver 17 has or can obtain the integer Internet address for the human-readable name, it (that is, the nameserver 17) will provide the integer Internet address to the device 12(*m*). The integer Internet address will be received by the packet generator 22 through the network interface 21 and packet receiver and processor 23. After the packet generator 22 receives the integer Internet address, it can generate the necessary message packets for transmission to the device 13 through the network interface 21 and ISP 11.

As noted above, one of the devices 13 connected to the Internet 14 is virtual private network 15, the virtual private network 15 including a firewall 30, a plurality of devices identified as servers 31(*s*), and a nameserver 32 interconnected by a communication link 33. The servers 31(*s*), firewall 30 and nameserver 32 can, as devices connected in a LAN or WAN, transfer information in the form of message packets thereamong. Since the firewall 30 is connected to the Internet 14 and can receive message packets thereover it has an Internet address. In addition, at least the servers 31(*s*)

which can be accessed over the Internet also have respective Internet addresses, and in that connection the nameserver 32 serves to resolve human-readable Internet addresses for servers 31(s) internal to the virtual private network 15 to respective integer Internet addresses.

Generally, the virtual private network 15 is maintained by a company, governmental agency, organization or the like, which desires to allow the servers 31(s) to access other devices outside of the virtual private network 15 and transfer information thereto over the Internet 14, but which also desires to limit access to the servers 31(s) by devices 12(m) and other devices over the Internet 14 in a controlled manner. The firewall 30 serves to control access by devices external to the virtual private network 15 to servers 31(s) within the virtual private network 15. In that operation, the firewall 30 also connects to the Internet 14, receives message packets therefrom for transfer to a server 31(s). If the message packet indicates that the source of the message packet is requesting access to the particular server 31(s), and if the source is authorized to access the server 31(s), the firewall 30 will forward the message packet over the communication link 33 to the server 31(s). On the other hand if the source is not authorized to access the server 31(s), the firewall 30 will not forward the message packet to the server 31(s), and may, instead, transmit a response message packet to the source device indicating that the source was not authorized to access the server 31(s). The firewall may be similar to other devices 31(s) in the virtual private network 15, with the addition of one or more connections to the Internet, which are generally identified by reference numeral 43.

Communications between devices external to the virtual private network 15, such as device 12(m), and a device, such as a server 31(s), inside the virtual private network 15, may be maintained over a secure tunnel between the firewall 30 and the external device as described above to maintain the information transferred therebetween secret while being transferred over the Internet 14 and through the ISP 11. A secure tunnel between device 12(m) and virtual private network 15 is represented in FIG. 1 by logical connections identified by reference numerals 40, 42, and 44; it will be appreciated that the logical connection 42 comprises one of the logical connections 41 between ISP 11 and Internet 14, and logical connection 44 comprises one of the logical connections 43 between the Internet 14 and the firewall 30.

Establishment of a secure tunnel can be initiated by device 12(m) external to the virtual private network 15. In that operation, the device 12(m), in response to a request from its operator, generates a message packet for transfer through the ISP 11 and Internet 14 to the firewall 30 requesting establishment of a secure tunnel between the device 12(m) and firewall 30. The message packet may be directed to a predetermined integer Internet address associated with the firewall 30 which is reserved for secure tunnel establishment requests, and which is known to and provided to the device 12(m) by the nameserver 17. If the device 12(m) is authorized to access a server 31(s) in the virtual private network 15, the client 12(m) and firewall 30 engage in a dialog, comprising one or more message packets transferred therebetween over the Internet 14. During the dialog, the firewall 30 may provide the device 12(m) with the identification of a decryption algorithm and associated decryption key which the device 12(m) is to use in decrypting the encrypted portions of message packets which the virtual private network transmits to the device 12(m). In addition, the firewall 30 may also provide the device 12(m) with the identification of an encryption algorithm and associated encryption key which the device 12(m) is to use in encrypting the portions of message packets which the device 12(m) transmits to the virtual private network 15 which are to be encrypted; alternatively, the device 12(m) can provide the identification of the encryption algorithm and key that it (that is device 12(m)) will use to the firewall 30 during the dialog. The device 12(m) can store in its IP parameter store 25 information concerning the secure tunnel, including information associating the identification of the firewall 30 and the identifications of the encryption and decryption algorithms and associated keys for message packets to be transferred over the secure tunnel.

Thereafter, the device 12(m) and firewall 30 can transfer message packets over the secure tunnel. The device 12(m), in generating message packets for transfer over the secure tunnel, makes use of the secure packet processor 26 to encrypt the portions of the message packets which are to be encrypted prior to transmission by the network interface 21 to the ISP 11 for transfer over the Internet 14 to the firewall 30, and to decrypt the encrypted portions of the message packets received by the device 12(m) which are encrypted. In particular, after the packet generator 22 generates a message packet for transmission to the firewall 30 over the secure tunnel, it will provide the message packet to the secure packet processor 26. The secure packet processor 26, in turn, encrypts the portions of the message packet that are to be encrypted, using the encryption algorithm and key. After the firewall 30 receives a message packet from the device 12(m) over the secure tunnel, it will decrypt it and, if the intended recipient of the message packet is another device, such as a server 31(s), in the virtual private network 14, it (that is, the firewall 30) will transfer the message packet to that other device over the communication link 33.

For a message packet that is to be transferred by a device, such as a server 31(s), in the virtual private network 15 to the device 12(m) over the secure tunnel, the firewall 30 will receive such to the message packet over the communication link 33 and encrypt the message packet for transfer over the Internet 14 to the ISP 11. The ISP 11, in turn, forwards the message packet to the device 12(m), in particular to its network interface 21. The network interface 21 provides the message packet to the secure packet processor 26, which decrypts the encrypted portions of the message packet, using the decryption algorithm and key.

A problem arises in connection with accesses by a device, such as device 12(m), which is external to the virtual private network 15, and a device, such as a server 31(s), which is external to the firewall, namely, that nameserver 17 is not provided with integer Internet addresses for servers 31(s) and other devices which are in the virtual private network 15, except for integer Internet addresses associated with the firewall 30. Thus, the device 12(m), after the operator has entered the human-readable Internet address, will not be able to obtain the integer Internet address of the server 31(s) which is to be accessed from that nameserver 17.

To accommodate this problem, when the device 12(m) and firewall 30 cooperate to establish a secure tunnel therebetween, in addition to possibly providing the device 12(m) with the identifications of the encryption and decryption algorithms and keys which are to be used in connection with the message packets transferred over the secure tunnel, the firewall 30 also provides the device 12(m) with the identification of a nameserver, such as nameserver 32, in the virtual private network 15 which the device 12(m) can access to obtain the appropriate integer Internet addresses for the human-readable Internet addresses which may be provided by the operator of device 12(m). The identification of nameserver 32 is also stored in the IP parameter store 25, along with the identification of nameserver 17 which was provided by the ISP 11 when the device 12(m) logged on to the ISP 11 at the beginning of a communications session. Thus, when the device 12(m) is to transmit a message packet to a device, such as a server 31(s) in the virtual private network 14 using a human-readable Internet address provided by, for example, an operator, the device 12(m) will initially access the nameserver 17, as described above, to attempt to obtain the integer Internet address associated with the human-readable Internet address. Since nameserver 17 is outside of the virtual private network 15 and will not have the information requested by the device 12(m), it will send a response message packet so indicating. The device 12(m) will thereafter generate a request message packet for transmission to the nameserver 32 through the firewall 30 and over the secure tunnel. If the nameserver 32 has an integer Internet address associated with the human-readable Internet address in the request message packet provided by the device 12(m), it will provide the integer Internet address in a manner that is generally similar to that described above in connection with nameserver 18, except that the integer Internet address will be provided by the nameserver 32 in a message packet directed to the firewall 30, and the firewall 30 will thereafter transmit the message packet over the secure tunnel to the device 12(m). In the message packet transmitted by the firewall 30, it will be appreciated that the integer Internet address in the message packet will be in the data portion of the message packet transferred over the secure tunnel and, accordingly, will be in encrypted form. The message packet will be processed by the device 12(m) in a manner similar to that described above in connection with other message packets received by it over the secure tunnel, that is, the message packet will be decrypted by the secure packet processor 26 prior to being provided to the packet receiver and processor 23 for processing. The integer Internet address for the server 31(s) can be cached in an access control list ("ACL") in the IP parameter store 25, along with the association of the human-readable Internet address thereto, an indication that the server 31(s) associated with that human-readable Internet address is to be accessed through the firewall 30 of the virtual private network 15, and the identifications of the encryption and decryption algorithms and keys to be used for encrypting and decrypting the appropriate portions of the message packets transmitted to server 31(s) and received from server 31(s).

It will be appreciated that, if the nameserver 32, in response to a message packet from the device 12(m) requesting the nameserver 32 to provide an integer Internet address for a human-readable Internet address provided by the device 12(m), if the nameserver 32 does not have an association between the human-readable Internet address and an integer Internet address, the nameserver 32 can provide a response message packet so indicating. If the device 12(m) has identification of other nameservers, such as may be associated with other virtual private networks (not shown), to which it (that is, device 12(m)) may have access, then the device 12(m) can attempt to access the other nameservers in a similar manner as described above. If the device 12(m) is unable to obtain an integer Internet address associated with the human-readable Internet address from any of the nameservers to which it has access, and which generally will be identified in its IP parameter store 25, it will generally be unable to access a device having the human-readable Internet address, and may so notify its operator or program which requested the access.

With this background, operations performed by the device 12(m) and virtual private network 15 in connection with the invention will be described in detail. Generally, operations proceed in two phases. In the first phase, the device 12(m) and virtual private network 15 cooperate to establish a secure tunnel through the Internet 14. In that first phase, the virtual private network 15, in particular the firewall 30 provide the identification of a nameserver 32, and may also provide the encryption and decryption algorithm and key information, as described above. In the second phase, after the secure tunnel has been established, the device 12(m) can use the information provided during the first phase in connection with generating and transferring message packets to one or more servers 31(s) in the virtual private network 15, in the process obtaining resolution human-readable Internet addresses to integer Internet addresses as necessary from the nameserver 32 that was identified by the firewall 30 during the first phase.

Thus, in the first (secure tunnel establishment) phase, the device 12(m) initially generates a message packet requesting establishment of a secure tunnel for transfer to the firewall 30. The message packet will include an integer Internet address for the firewall (which may have been provided by the device's operator or a program being processed by the device 12(m) or have been provided by a the nameserver 17 after a human-readable Internet address was provided by the operator or a program), and which, in particular, is to enable the firewall 30 to establish secure tunnels therewith. If the firewall 30 accepts the secure tunnel establishment request, and if the firewall 30 provides the encryption and decryption algorithms and keys as noted above, it (that is, the firewall) will generate a response message packet for transmission to the device 12(m) that identifies the encryption and decryption algorithms and keys; as noted above, this response message packet will not be encrypted. When the device 12(m) receives the response message, the identifications of the encryption and decryption algorithms and keys will be stored in the IP parameter store 25.

At some point later in the first phase, the firewall 30 will also generate a message packet for transmission to the device 12(m) that includes the integer Internet address of the nameserver 32. For this message packet, the portion of the message packet that contains the integer Internet address of the nameserver 32 will be encrypted, using encryption algorithm and key that can be decrypted using the decryption algorithm and key provided in the response message packet described above. This message will generally have a structure "<IIA(FW),IIA(DEV12(m))><SEC_TUN>
<ENCR<<IIA(FW),IIA(DEV_12(m))><DNS_ADRS:IIA(NS_32)>>>"
where
 (i) "IIA(FW)" represents the source address, that is, integer Internet address of the firewall 30,
 (ii) "IIA(DEV_12(m))" represents the destination address, that is, the integer Internet address of the device 12(m),
 (iii) "DNS_ADRS:IIA(NS) indicates that "IIA(NS_32)" represents the integer Internet address of the nameserver 32, the nameserver which the device 12(m) is authorized to use, and
 (iv) "ENCR< . . . >" indicates that the information between brackets "<" and ">" is encrypted.
The initial portion of the message "<IIA(FW),IIA(DEV_12(m))>" forms at least part of the header portion of the message, and "<ENCR<<IIA(FW),IIA(DEV_12(m))><IIA(NS)>>>" represents at least part of the data portion of the message. The "<SEC_TUN>" represents an indicator in the header indicating that the message is being transferred over the secure tunnel, thereby indicating that the data portion of the message contains encrypted information.

After the device 12(*m*) receives the message from the firewall 30 as described above, since the message packet contains the <SEC_TUN> indicator, its network interface 21 will transfer the encrypted portion "<ENCR<<IIA(FW),IIA(DEV_12(*m*))><DNS_ADRS:IIA(NS_32)>>>" to the secure packet processor 26 for processing. The secure packet processor will decrypt the encrypted portion, determine that the portion "IIA(NS_32)" is the integer Internet address of a nameserver, in particular nameserver 32, that the device 12(*m*) is authorized to use, and store that address in the IP parameter store 25, along with an indication that message packets thereto are to be transferred to the firewall 30 and that data in the message packets is to be encrypted using the encryption algorithm and key previously provided by the firewall 30. It will be appreciated that, since the integer Internet address of nameserver 32 is transferred from the firewall to the device 12(*m*) in encrypted form, it will be maintained in confidence even if the packet is intercepted by a third party.

Depending on the particular protocol used to establish the secure tunnel, the firewall 30 and device 12(*m*) may also exchange message packets containing other information than that described above.

As noted above, in the second phase, after the secure tunnel has been established, the device 12(*m*) can use the information provided during the first phase in connection with generating and transferring message packets to one or more of the servers 31(*s*) in the virtual private network 15. In those operations, if the operator of device 12(*m*), or a program being processed by device 12(*m*), wishes to have device 12(*m*) transmit a message packet to a server 31(*s*) in the virtual private network 15, if the operator, through the operator interface 20, or the program provides a human-readable Internet address, the device 12(*m*), in particular the packet generator 22, will initially determine whether the IP parameter store 25 has cached therein an integer Internet address that is associated with the human-readable Internet address. If not, the packet generator 22 will generate a request message packet for transfer to the nameserver 17 requesting it to provide the integer Internet address associated with the human-readable Internet address. If the nameserver 17 has an integer Internet address associated with the human-readable Internet address, it will provide the integer Internet address to the device 12(*m*). It will be appreciated that this may occur if the human-readable Internet address in the request message packet has been associated with a device 13 external to the virtual private network 15, as well as with a server 32(*s*) in the virtual private network 15. Thereafter, the device 12(*m*) can use the integer Internet address to generate message packets for transfer over the Internet as described above.

Assuming, on the other hand, that the nameserver 17 does not have a integer Internet address associated with the human-readable Internet address, it (that is, the nameserver 17) will provide a response message packet so indicating to the device 12(*m*). Thereafter, the packet generator 22 of device 12(*m*) will generate a request message packet for transmission to the next nameserver identified in its IP parameter store 25 requesting that nameserver to provide the integer Internet address associated with the human-readable Internet address. If that next nameserver is nameserver 32, the packet generator 22 will provide the message packet to the secure packet processor 26 for processing. The secure packet processor 26, in turn, will generate a request message packet for transfer over the secure tunnel to the firewall 30. This message will generally have a structure
"<IIA(DEV_12(*m*)),IIA(FW)><SEC_TUN>
<ENCR<<IIA(DEV_12(*m*)),IIA(NS_32))><IIA_REQ>>>"
where
  (i) "IIA(DEV_12(*m*))" represents the source address, that is, integer Internet address of the device 12(*m*)
  (ii) "IIA(FW)" represents the destination address, that is, the integer Internet address of the firewall 30
  (iii) "IIA(NS_32)" represents the address of the nameserver 32
  (iii) "<<IIA(DEV_12(*m*)),IIA(NS_32))><IIA REQ>>" represents the request message packet generated by the packet generator 22, where "<IIA(DEV_12(*m*)),IIA(NS_32)>" represents the header portion of the request message packet, and "<IIA_REQ>" represents the data portion of the request message packet,
  (iv) "ENCR< . . . >" indicates that the information between brackets "<" and ">" is encrypted, and
  (v) "<SEC_TUN>" represents an indicator in the header portion of the message packet generated by the secure packet generator 26 indicating that the message is being transferred over the secure tunnel, thereby indicating that the data portion of the message contains encrypted information.

When the firewall 30 receives the request message packet generated by the secure packet processor 26, it will decrypt the encrypted portion of the message packet to obtain <<IIA(DEV_12(*m*)),IIA(NS_32))><IIA_REQ>>" represents the request message packet as generated by the packet generator 22. After obtaining the request message packet, the firewall 30 will transmit it over the communication link 33 to the nameserver 32. In that process, depending on the protocol for transmission of message packets over the communication link 33, the firewall 30 may need to modify the request message packet to conform to the protocol of communication link 33.

After the nameserver 32 receives the request message packet, it will process it to determine whether it has an integer Internet address associated with the human-readable Internet address provided in the request message packet. If the nameserver determines that it has such an integer Internet address, it will generate a response message packet including the integer Internet address for transmission to the firewall. Generally, the response message packet will have a structure:
<<IIA(NS_32),IIA(DEV_12(*m*))><IIA_RESP>>
where
  (i) "IIA(NS_32)" represents the source address, that is, integer Internet address of the nameserver 32,
  (ii) "IIA(DEV_12(*m*))" represents the destination address, that is, integer Internet address of the device 12(*m*), and
  (iii) "IIA_RESP" represents the integer Internet address associated with the human-readable Internet address.
After the firewall 30 receives the response message packet, since communications with device 12(*m*) are over the secure tunnel therebetween, it (that is, the firewall 30) will encrypt the response message packet received from the nameserver 32 and generate a message packet for transmission to the device 12(*m*) including the encrypted response message packet. Generally, the message packet generated by the firewall 30 has the structure:
"<IIA(FW),IIA(DEV12(*m*))><SEC_TUN>
<ENCR<<IIA(NS_32),IIA(DEV_12(*m*))><IIA_RESP>>>"

where
  (i) "IIA(FW)" represents the source address, that is, integer Internet address of the firewall 30,
  (ii) "IIA(DEV_12(*m*))" represents the destination address, that is, the integer Internet address of the device 12(*m*),
  (iii) "SEC_TUN" represents an indicator in the header portion of the message packet generated by the secure packet generator 26 indicating that the message is being transferred over the secure tunnel, thereby indicating that the data portion of the message contains encrypted information, and
  (iv) "ENCR< . . . >" indicates that the information between brackets "<" and ">" (which constitutes the response message packet received from the nameserver 32) is encrypted.

In addition, depending on the protocol for transmission of message packets over the communication link 33, the firewall 30 may need to process and/or modify the message packet to conform to the protocol of Internet 14.

When the device 12(*m*) receives the message packet from the firewall 30, it (that is, the message packet) will be provided to the secure packet processor 26. The secure packet processor 26, in turn, will decrypt the encrypted portion of the message packet to obtain the integer Internet address associated with the human-readable Internet address, and load that information in the IP parameter store 25. Thereafter, the device can use that integer Internet address in generating message packets for transmission to the server 31(*s*) which is associated with the human-readable Internet address.

It will be appreciated that, if the nameserver 32 does not have an integer Internet address associated with the human-readable Internet address provided by the device 12(*m*) in the request message packet, it (that is, nameserver 32) can so indicate in the response message packet generated thereby. The firewall 30 will, in response to the response message packet provided by the nameserver 32, also generate a message packet for transmission to the device 12(*m*), the message packet including an encrypted portion comprising the response message packet generated by the nameserver 32. After the device 12(*m*) receives the message packet, the encrypted portion will be decrypted by the secure packet processor 26, which, in turn, will notify the packet generator 22 that the nameserver 32 does not have an integer Internet address associated with the human-readable Internet address. Thereafter, if the IP parameter store 25 contains the identification of another nameserver, the packet generator 22 of device 12(*m*) will generate a request message packet for transmission to the next nameserver identified in its IP parameter store 25 requesting that nameserver to provide the integer Internet address associated with the human-readable Internet address. On the other hand, if the IP parameter store 25 does not contain the identification of another nameserver, the packet generator 22 can notify the operator interface 20 or program that it is will be unable to generate a message packet for transmission to a device associated with the human-readable Internet address provided thereby.

The invention provides a number of advantages. In particular, it provides a system for easing communications between devices connected to a public network such as the Internet 14, and devices connected to private networks such as virtual private network 15, by facilitating resolution of human-readable addresses to network addresses by a nameservers connected to the private networks over a secure tunnel.

It will be appreciated that numerous modifications may be made to the arrangement described above in connection with FIG. 1. For example, although the network 10 has been described such that the identification of the encryption and decryption algorithms and keys are exchanged by the device 12(*m*) and firewall 30 during the dialog during which the secure tunnel is established, it will be appreciated that that information may be provided by the device 12(*m*) and firewall 30 separately from the establishment of a secure tunnel therebetween.

In addition, although the invention has been described in connection with the Internet, it will be appreciated that the invention can be used in connection with any network. Further, although the invention has been described in connection with a network which provides for human-readable network addresses, it will be appreciated that the invention can be used in connection with any network which provides for any form of secondary or informal network address arrangements.

It will be appreciated that a system in accordance with the invention can be constructed in whole or in part from special purpose hardware or a general purpose computer system, or any combination thereof, any portion of which may be controlled by a suitable program. Any program may in whole or in part comprise part of or be stored on the system in a conventional manner, or it may in whole or in part be provided in to the system over a network or other mechanism for transferring information in a conventional manner. In addition, it will be appreciated that the system may be operated and/or otherwise controlled by means of information provided by an operator using operator input elements (not shown) which may be connected directly to the system or which may transfer the information to the system over a network or other mechanism for transferring information in a conventional manner.

The foregoing description has been limited to a specific embodiment of this invention. It will be apparent, however, that various variations and modifications may be made to the invention, with the attainment of some or all of the advantages of the invention. It is the object of the appended claims to cover these and such other variations and modifications as come within the true spirit and scope of the invention.

What is claimed as new and desired to be secured by Letters Patent of the United States is:

1. A system comprising a virtual private network and an external device interconnected by a digital network,
  the virtual private network having a firewall, at least one internal device and a nameserver each having a virtual private network address, wherein the external device has been provided only the virtual private network address of the firewall prior to the establishment of a secure tunnel connection therebetween, the internal device also having a secondary address, the nameserver being configured to provide an association between the secondary address and the virtual private network address,
  the firewall is configured to, in response to a request from the external device to establish a secure tunnel connection therebetween, provide the external device with the virtual private network address of the nameserver, and
  the external device is configured to, in response to a request requesting access to the internal device including the internal device's secondary address, generate a network address request message for transmission over the secure tunnel connection to the firewall requesting resolution of the virtual private network address associated with the secondary address, the firewall being configured to provide the address resolution request to the nameserver, the nameserver being configured to provide the virtual private network address associated with the secondary address, the firewall in turn being further configured to provide the virtual private network address in a network address message for transmission over the secure tunnel connection to the external device.

2. A system as defined in claim 1 in which the external device is further configured to use the network address provided in the network address response message in generating at least one message for transmission to the internal device.

3. A system as defined in claim 1 in which the external device is configured to connect to the network through a network service provider.

4. A system as defined in claim 3 in which the external device is configured to establish a communications session with the network service provider, the network service provider providing the external device with the identification of a further nameserver, the further nameserver being configured to provide an association between a secondary address and a network address for at least one device.

5. A system as defined in claim 1 in which the external device is configured to maintain a list of nameservers which have been identified to said external device, the external device being configured to interrogate successive ones of the nameservers in the list in response to a request requesting access to another device, said request including a secondary address for said other device, until said external device receives a network address, in each interrogation the external device being configured to generate a said network address request message for transmission over the network for response by one of said nameservers in said list and to receive a network address response message therefrom.

6. A system as defined in claim 1 in which at least some portion of messages transferred between the external device and the firewall over the secure tunnel connection is encrypted.

7. A method of operating a system comprising a virtual private network and an external device interconnected by a digital network, the virtual private network having a firewall, at least one internal device and a nameserver each having a virtual private network address, wherein the external device has been provided only the virtual private network address of the firewall prior to the establishment of a secure tunnel connection therebetween, the internal device also having a secondary address, the nameserver being configured to provide an association between the secondary address and the virtual private network address, the method comprising the steps of:

A. enabling the firewall, in response to a request from the external device to establish a secure tunnel connection therebetween, provide the external device with the virtual private network address of the nameserver; and B. enabling
(i) the external device, in response to a request requesting access to the internal device including the internal device's secondary address, to generate a network address request message for transmission over the secure tunnel connection to the firewall requesting resolution of the virtual private network address associated with the secondary address,
(ii) the firewall to provide the address resolution request to the nameserver,
(iii) The nameserver to provide the virtual private network address associated with the secondary address, and
(iv) the firewall to provide the virtual private network address in a network address response message for transmission over the secure tunnel connection to the external device.

8. A method as defined in claim 7 in which the external device is further enabled to use the network address provided in the network address response message in generating at least one message for transmission to the internal device.

9. A method as defined in claim 7 in which the external device is enabled to connect to the network through a network service provider.

10. A method as defined in claim 9 in which the external device is enabled to establish a communications session with the network service provider, the network service provider being enabled to provide the external device with the identification of a further nameserver, the further nameserver being enabled to provide an association between a secondary address and a network address for at least one device.

11. A method as defined in claim 7 in which the external device is enabled to maintain a list of nameservers which have been identified to said external device, the external device being enabled to interrogate successive ones of the nameservers in the list in response to a request requesting access to another device, said request including a secondary address for said other device, until said external device receives a network address, in each interrogation the external device being enabled to generate a said network address request message for transmission over the network for response by one of said nameservers in said list and to receive a network address response message therefrom.

12. A method as defined in claim 7 in which at least some portion of messages transferred between the external device and the firewall over the secure tunnel connection is encrypted.

13. A computer program product for use in connection with a virtual private network and an external device interconnected by a digital network, the virtual private network having a firewall, at least one internal device and a nameserver each having a virtual private network address, wherein the external device has been provided only the virtual private network address of the firewall prior to the establishment of a secure tunnel connection therebetween, the internal device also having a secondary address, the nameserver being configured to provide an association between the secondary address and the virtual private network address, the computer program product comprising a machine readable medium having encoded thereon:

A. a nameserver identification code module configured to enable the firewall, in response to a request from the external device to establish a secure tunnel connection therebetween, to provide the external device with the virtual private network address of the nameserver, B. a network address request message generating code module for enabling the external device, in response to a request requesting access to the internal device including the internal device's secondary address, to generate a network address request message for transmission over the secure tunnel connection to the firewall requesting resolution of the virtual private network address associated with the secondary address, C. an address resolution request forwarding module for enabling the firewall to provide the address resolution request to the nameserver, D. a nameserver control module for enabling the nameserver to provide the virtual private network address associated with the secondary address, and E. a network address response message forwarding module for enabling the firewall to provide the virtual private network address in a network address response message for transmission over the connection to the external device.

14. A computer program product as defined in claim 13 further comprising a network address utilization module configured to enable the external device to use the network address provided in the network address response message in generating at least one message for transmission to the internal device.

15. A computer program product as defined in claim 13 further comprising a network service provider control module for enabling the external device to connect to the network through a network service provider.

16. A computer program product as defined in claim 15 in which the network service provider control module includes a communications session establishment module for enabling the external device to a communications session with the network service provider and receive therefrom identification of a further nameserver.

17. A computer program product as defined in claim 13 further including nameserver interrogation control module for enabling the external device to maintain a list of nameservers which have been identified to said external device, and to interrogate successive ones of the nameservers in the list in response to a request requesting access to another device, said request including a secondary address for said other device, until said external device receives a network address, in each interrogation the external device being enabled to generate a said network address request message for transmission over the network for response by one of said nameservers in said list and to receive a network address response message therefrom.

18. A computer program product as defined in claim 14 in which the connection between the external device and the firewall is a secure tunnel, in which at least some portion of messages transferred between tie external device and the firewall is encrypted.

* * * * *

UNITED STATES PATENT AND TRADEMARK OFFICE
CERTIFICATE OF CORRECTION

PATENT NO.    : 6,557,037 B1
DATED         : April 29, 2003
INVENTOR(S)   : Joseph E. Provino It is certified that error appears in the above-identified patent and that said Letters Patent is hereby corrected as shown below:

Column 20,
Line 16, after "between", please delete "tie" insert -- the --.

Signed and Sealed this

Twenty-fourth Day of June, 2003

JAMES E. ROGAN
*Director of the United States Patent and Trademark Office*